United States Patent
Hsieh et al.

(10) Patent No.: US 9,436,427 B2
(45) Date of Patent: Sep. 6, 2016

(54) AUGMENTED REALITY SYSTEM AND METHOD FOR ON-SITE CONSTRUCTION PROCESS

(71) Applicant: National Taiwan University, Taipei (TW)

(72) Inventors: Shang-Hsien Hsieh, Taipei (TW); Shih-Chung Kang, Taipei (TW); Ting-Hui Lin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 39 days.

(21) Appl. No.: 14/330,225

(22) Filed: Jul. 14, 2014

(65) Prior Publication Data

US 2016/0011842 A1    Jan. 14, 2016

(51) Int. Cl.
| | |
|---|---|
| *G06F 3/14* | (2006.01) |
| *G06T 11/60* | (2006.01) |
| *H04W 12/08* | (2009.01) |
| *G06F 3/147* | (2006.01) |
| *H04L 29/06* | (2006.01) |

(52) U.S. Cl.
CPC ............. *G06F 3/1438* (2013.01); *G06F 3/147* (2013.01); *G06T 11/60* (2013.01); *H04L 63/105* (2013.01); *H04W 12/08* (2013.01); *G06T 2210/04* (2013.01); *G09G 2340/12* (2013.01); *G09G 2354/00* (2013.01)

(58) Field of Classification Search
CPC ...... G06F 3/1438; G06F 3/041; G06F 3/014; G06F 3/147; G06T 11/60; G06T 2210/04; H04W 12/08; H04N 7/15; H04N 7/152; H04L 65/403; H04L 63/105; H04M 3/567; G09G 2340/12; G09G 2354/00

USPC .......................................................... 345/173
See application file for complete search history.

(56) References Cited

U.S. PATENT DOCUMENTS

| | | | | |
|---|---|---|---|---|
| 6,944,651 | B2* | 9/2005 | Onyon .................. | G06Q 10/109 |
| | | | | 707/E17.111 |
| 7,945,622 | B1* | 5/2011 | Pegg ...................... | G06Q 10/10 |
| | | | | 709/204 |
| 8,161,159 | B1* | 4/2012 | Shetty ................. | H04L 12/1827 |
| | | | | 709/226 |
| 8,775,327 | B2* | 7/2014 | Millmore ............. | G06Q 10/105 |
| | | | | 705/320 |
| 2003/0032409 | A1* | 2/2003 | Hutcheson ............. | G06Q 30/02 |
| | | | | 455/414.1 |
| 2012/0131648 | A1* | 5/2012 | Hayashida ............. | G06Q 10/10 |
| | | | | 726/4 |
| 2013/0246454 | A1* | 9/2013 | Menten ............. | G06F 17/30625 |
| | | | | 707/769 |
| 2014/0033073 | A1* | 1/2014 | Pegg ...................... | H04L 65/403 |
| | | | | 715/753 |
| 2014/0038668 | A1* | 2/2014 | Vasavada ............ | H04L 65/4061 |
| | | | | 455/556.1 |
| 2015/0006654 | A1* | 1/2015 | Couchon ................. | H04L 51/36 |
| | | | | 709/206 |

* cited by examiner

*Primary Examiner* — Tom Sheng
(74) *Attorney, Agent, or Firm* — patenttm.us (57) ABSTRACT

The present invention relates to an augmented reality system for use in an on-site construction process. The augmented reality system includes a plurality of mobile devices, each of which is operable by an authorized user, includes a private information accessible to the authorized user and has a tangible touch-display screen for showing the private information; and a central processing station electrically connected with each of the plurality of mobile devices, including a public information accessible to all of the authorized users and having a tangible touch-display interface for showing the public information, wherein when the private information included in one of the plurality of mobile devices and accessible to the authorized user is transmitted to the central processing station, it is regarded as the public information and accessible to all of the authorized users.

18 Claims, 6 Drawing Sheets

AUGMENTED REALITY SYSTEM AND METHOD FOR ON-SITE CONSTRUCTION PROCESS

FIELD OF THE INVENTION

The present invention relates to an augmented reality system, in particular to an augmented reality system equipped with multiple touch-display screens and used in an on-site construction process for civil engineering.

BACKGROUND OF THE INVENTION

Usually, a discussion activity among group members provides a significant function for well solving problems currently encountered by combining and integrating diverse knowledge, different ideas and various perspectives into high quality decisions and innovations. On the contrary, group members can reach consensus and make better decision more easily through discussion activities. Basically, the discussion activity is essentially an information sharing and integrating process. Group members who involve in a discussion activity usually retrieve the discussion topic and analyze it in their minds by utilizing their specialized background knowledge. They provide different comments and suggestions for the discussion topic, enumerate evidence to support their opinions and try to unify other opinions to make a final conclusion regarding to the discussion topic.

In general, during a regular discussion process, several problems will raise which influence the quality of final conclusion. There are also challenges that sometimes obstruct the successful rate of solving the discussed issue if the issue were not addressed carefully. The challenges to proceed an effective discussion are listed as follows:

(1) Participants cannot definitely express what they are actually thinking. Gaps always exist between the mental ideas and the way they have been actually expressed. It is even worse for a communication among participants from different technical fields. Consequently, it is apparent that each participant spends a lot of time trying to understand each other, explains project information to the other and is incapable of leveraging information to support decision-making and solve problems.

(2) It is also a major problem in lack of an integrated platform and an appropriate media for facilitating interactions among participants from different technical fields or organizations. The discussion only based on the paper documentation is not enough to fully and clearly express the complicated and sophisticated information nowadays, but there exists only quite a few supporting tools nowadays to share relevant information easily and flexibly and no systematical or intuitive visualization tools effective enough to reduce communication misunderstanding.

(3) The opinions raised in the discussion may be diverged depending on how much each participant understands the discussion topic. It also causes too much irrelevant information beyond some participants' concern still being significantly emphasized during the discussion.

In particular, a discussion process is even more complicated for any on-site construction in civil engineering field. A construction site layout planning (CSLP) needs many experts from different disciplines to work to obtain her to make decisions and solve problems. For a long time, the construction site layout planning is considered as a critical part in construction planning by practitioners, inventors and researchers. A good on-site layout planning can increase the productivity for the construction activities, improve safety and avoid obstructing materials and equipment movements in the construction site. Unfortunately, there are few efforts regarding exploring the interaction of onsite information with the field crew.

A project manager has to call several brief meetings regarding the construction plan and progress every day and schedule and coordinate daily activities among different contractors and workers in order to control the construction machinery and to improve the safety and productivity of construction. The conventional meeting flow is as follows: every sub-contractor provides their construction plans, such as the schedule to the working items they take, the moving path of their equipments and so on, to the site director in paper format. The site director makes a feasible integration and arrangement according to every sub-contractor's plan. However, the traditional approach becomes ineffective and is prone to create errors because only the experienced and well-trained planners are able to generate the effective layout design with paper script. Observations of the project meetings reveal that communicating project information through paper-based graphical representations limits the team's ability to solve problems and make decisions. Since there is so much information, such as the diagrams and detailed schedules, the team requires and refers to during the meeting, it is hard for the team to focus on the same issue.

Despite the advancement in computer-aided engineering technology for civil engineering construction which can be used for helping planners in their decision-making process by allowing them to express various scenarios by taking several interrelated factors into consideration for site layout and path finding, there remains a lack of multi-disciplinary and multi-organizational discussion environment that can assist project teams in formulating this plan. However, site planners who have a key role in the site management currently rely mainly on their experience and intuition when considering the allocations of paths for logistics, vehicles, and site operatives.

In response to the current challenge of discussion activity, it is necessary to create an effective discussion platform that distinguishes and provides an intuitive user interface to help communications and interactions among different participants. Information interaction approaches can increase the visibility and readability of information so users can browse, and diagnose problems from the information effectively. Therefore, the present invention provides a discussion environment to provide a more intuitive cooperation and communication approach, to decrease the possibility of construction conflicts, help engineers to improve site layout discussion and in particular, information sharing and interaction.

It is therefore attempted by the applicant to deal with the above situation encountered in the prior art.

SUMMARY OF THE INVENTION

In view of the prior art, the present invention focuses on developing the use of augmented reality technology in a multi-screen environment to separate information to the public from information to the private for the on-site construction, so as to facilitate the efficiency and to eliminate misunderstanding during the construction process. Typically the discussing flow is as follows. The respective participants initially have their concepts or ideas as their private issue. Then the private issue is moved to a public space as a public discussion issue that every participant can freely access and discuss the issue, as long as the proposed participant considers it is adequate to open the private issue to the public. They thus provide different comments and suggestions for discussion issues. After public discussion, each participant receives information from others and come up with their new ideas or opinions by utilizing their professional background knowledge. Trying to figure out a better solution or making decisions. Finally they unify and coordinate all opinions to make final conclusion regarding to the discussion issue. The discussion process is basically a cycle of interactions between public and private information. So we separate discussion information into two parts, public information and private information.

In the present invention, a central processing station is used as a platform for public information. As for private information, they will be contained in each participant's mobile devices. The augmented reality is utilized to present public and private information to render the information clearer and easier to be understood. For exchanging information, a tangible user interface is utilized to render the information directly graspable and manipulable through haptic feedback. By setting up the discussion environment as above, we coined this discussion environment as AR-MS (augmented reality and multi-screen) system. The present invention intents to provide an effective discussion environment, which distinguishes information and provides an intuitive user interface to help communication interactions among different participants.

To validate the usability of the AR-MS system, we conduct a user test with actual and potential participants. By comparing the completion times and the correctness rates of three different tasks representing three levels in construction discussion using AR-MS and the conventional paper-based reference to prove that the AR-MS system can improve the browsing efficiency of construction information, and provide more well-visualized information to users.

In accordance with the first aspect of the present invention, an augmented reality system for use in an on-site construction process is provided. The augmented reality system includes a plurality of mobile devices, each of which is operable by an authorized user, includes a private information accessible to the authorized user and has a tangible touch-display screen for showing the private information; a central processing station electrically connected with each of the plurality of mobile devices, including a public information accessible to all of the authorized users and having a tangible touch-display interface for showing the public information; and a plurality of tangible markers recognizable by the plurality of mobile devices and optionally placed on the tangible touch-display interface, wherein when the private information included in one of the plurality of mobile devices and accessible to the authorized user is transmitted to the central processing station, it is regarded as the public information and accessible to all of the authorized users.

In accordance with the second aspect of the present invention, an augmented reality system for use in an on-site construction process is provided. The augmented reality system includes a plurality of mobile devices, each of which is operable by an authorized user, includes a private information accessible to the authorized user and has a tangible touch-display screen for showing the private information; and a central processing station electrically connected with each of the plurality of mobile devices, including a public information accessible to all of the authorized users and having a tangible touch-display interface for showing the public information, wherein when the private information included in one of the plurality of mobile devices and accessible to the authorized user is transmitted to the central processing station, it is regarded as the public information and accessible to all of the authorized users.

In accordance with the third aspect of the present invention, an augmented reality method for use in an on-site construction process is provided. The augmented reality method includes the steps of providing a plurality of mobile devices, each of which is operable by an authorized user, includes a private information accessible to the authorized user and has a tangible touch-display interface for showing the private information; providing a central processing station electrically connected with each of the plurality of mobile devices, including a public information accessible to all of the authorized users and having a tangible touch-display interface for showing the public information; and sending the private information to the central processing station by the authorized user for rendering the private information to be the public information accessible to all of the authorized users.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The First Embodiment

Figure 1A:
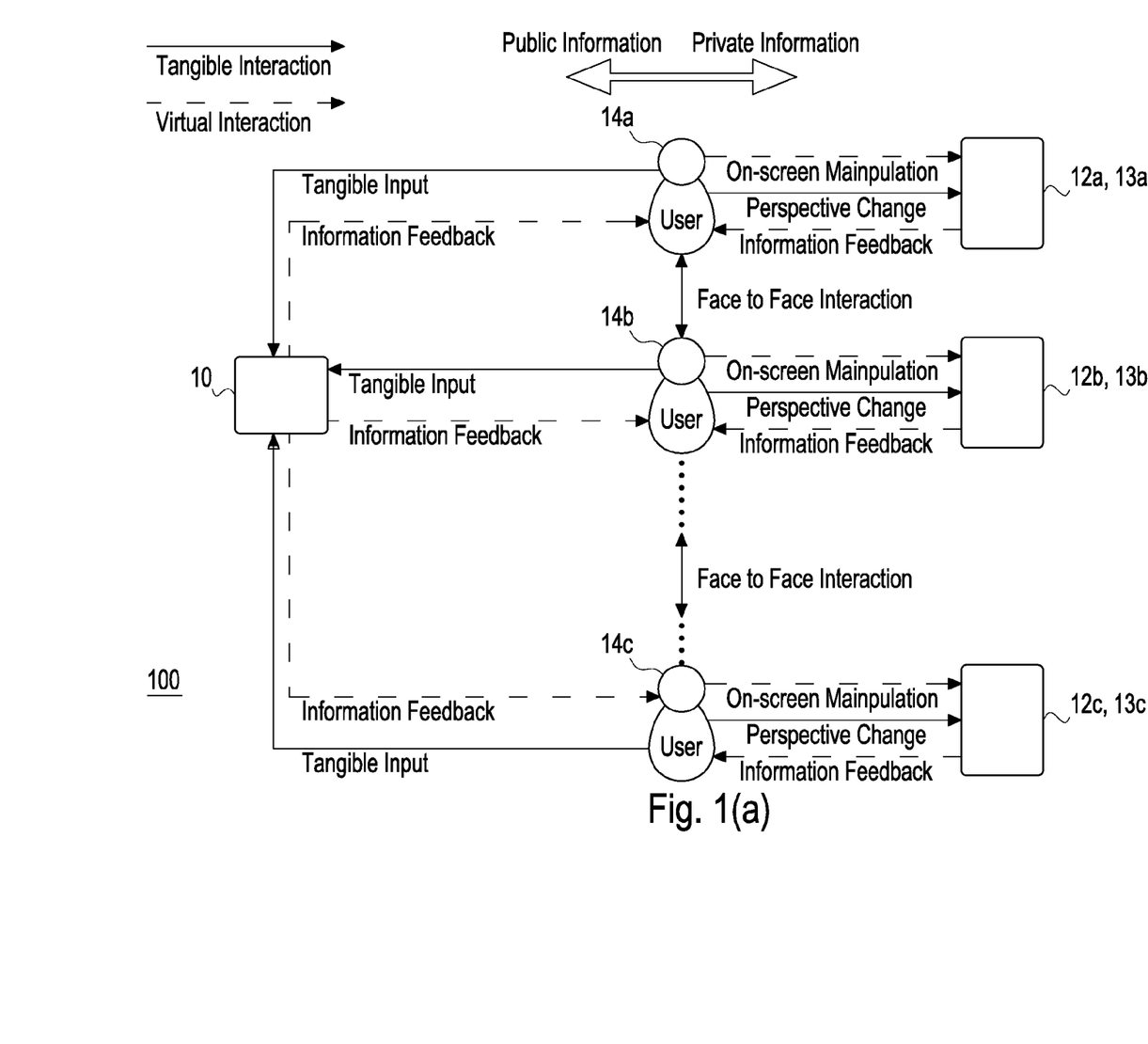
FIG. 1(a) shows a schematic diagram illustrating essential system concept for the AR-MS system in accordance with the present invention.
Figure 1B:
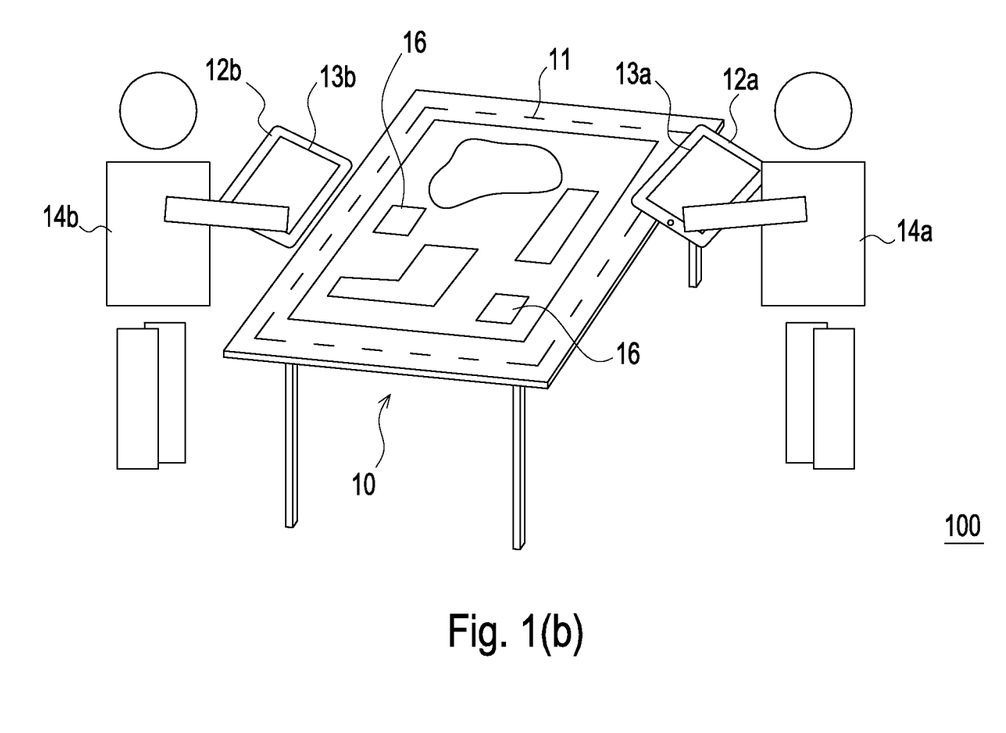
FIG. 1(b) shows a schematic diagram illustrating essential system architecture for the AR-MS system in accordance with the present invention.

FIG. 1(a) shows a schematic diagram illustrating essential system concept for the AR-MS system in accordance with the present invention. FIG. 1(b) is a schematic diagram illustrating essential system architecture for the AR-MS system in accordance with the present invention. Please refer to FIGS. 1(a) and 1(b) at the same time. The augmented reality multi-screen (AR-MS) system 100 includes a central processing station 10 and a plurality of mobile devices 12a, 12b and 12c. Each mobile devices 12a, 12b and 12c are electrically connected with the central processing station 10 and operable by an authorized user 14a, 14b and 14c respectively. The central processing station 10 has a tangible touch-display interface 11, such as a touch LCD (Liquid Crystal Display) screen and each mobile devices 12a, 12b and 12c also have tangible touch-display screens 13a, 13b and 13c respectively, such as a touch LCD (Liquid Crystal Display) screen.

A part of the information stored or included in the mobile devices 12a, 12b and 12c is categorized as or referred to as the private information that is allowed to be accessible only to the authorized users 14a, 14b and 14c respectively but not to other authorized users or all of the authorized users. The information stored or included in the central processing station 10 is categorized as or referred to as the public information that is publically accessible to anyone of or all of the authorized users 14a, 14b and 14c. Each mobile devices 12a, 12b and 12c can store and process both public information publically accessible to anyone of or all of the authorized users 14a, 14b and 14c and private information allowed to be accessible to an authorized user 14a, 14b and 14c respectively and the central processing station 10 is used for storing and processing public information accessible to anyone of or all of the authorized users 14a, 14b and 14c. If any of the information stored in one of the mobile devices 12a, 12b and 12c is transmitted to the central processing station 10, it is regarded as the public information and is publically accessible to anyone of or all of the authorized users 14a, 14b and 14c.

Thus, in FIG. 1(a), the information is split into two types, the public information and the private information respectively. The public information is displayed on and processed through both the respective mobile devices 12a, 12b and 12c and the central processing station 10, and the private information is displayed on and processed by the respective mobile devices 12a, 12b and 12c only. The different arrows among the central processing station 10, the users 14a, 14b and 14c and the mobile devices 12a, 12b and 12c in FIG. 1(a) represent the different interaction scheme thereamong. The solid line arrows refer to the substantial tangible interaction scheme and the dashed line arrows refer to the virtual interaction scheme. For the public information, the users 14a, 14b and 14c use tangible input to manipulate physical information on the central processing station 10 and receive information feedback from the central processing station 10. For the private information, users 14a, 14b and 14c can access and manipulate the virtual information on the tangible touch-display screens 13a, 13b and 13c of their own mobile device. By altering perspectives, users can obtain more special information and can also obtain information feedback due to change of perspective or on-screen manipulation. A regular face-to-face interaction can also be used among users.

The public information mainly shows the information on which the construction team focuses, such as the task or topic planned to be achieved. Users 14a, 14b and 14c can also receive and see the augmented reality information regarded as the public information through their own mobile device 12a, 12b and 12c for improving the understanding for discussion. Users 14a, 14b and 14c can directly manipulate the tangible markers 16 on the touch-display interface 11 of the central processing station 10 as a tangible input, and obtain synchronous visual information feedback during the process of manipulation. For example, when users 14a, 14b and 14c want to arrange construction vehicles' routes, users 14a, 14b and 14c can manipulate the tangible makers 16 representing construction vehicles on the touch-display interface 11 of the central processing station 10. When markers are put on the different places on the touch-display interface 11, users 14a, 14b and 14c can obtain immediate feedback regarding the arranged vehicles' routes calculated from the central processing station 10 in real-time.

For private information, users 14a, 14b and 14c from different technical field can only see the relevant professional information on the central processing station 10 through their personal mobile devices at the same time. Users 14a, 14b and 14c can filter the massive information from the central processing station 10. Each users 14a, 14b and 14c can only select the information they want to focus and make their own plan without disturbing others or keep their own plan private due to some business privacy issue. Based on the private information obtained from their own mobile device, users 14a, 14b and 14c can make their own prediction to help the discussion and see the results on their own mobile device. In private information users can browse more professional or detailed information that they don't want others to see on their own mobile device. Users 14a, 14b and 14c can also decide whether the information others need to see or not, for avoiding distracting the discussion progress.

Acting as a public information display, the central processing station 10 is a device or platform that every user in the discussion can obtain, share and exchange information. For example, when users 14a, 14b and 14c are discussing current construction schedule and trying to arrange a better route for different construction vehicles, they can see the route shown on the touch-display interface 11 on the central processing station 10.

In this environment, every user in the discussion has its own mobile device, which is considered as a personal information viewer. Users can access their private information on their devices. It can be replaced by any mobile device with a camera and an augmented reality application installed, such as a smart phone or a tablet computer.

Figure 2A:
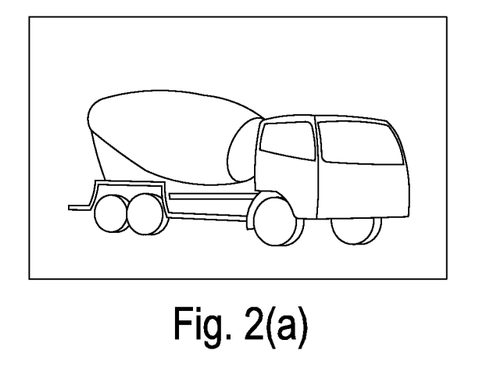
FIGS. 2(a), 2(b), 2(c) and 2(d) show schematic diagrams illustrating the tangible markers for the central processing station in accordance with the present invention.
Figure 2B:
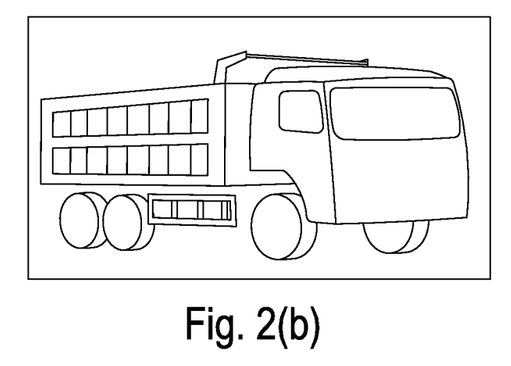
Figure 2C:
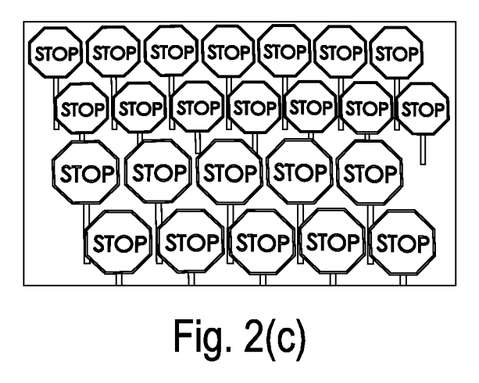
Figure 2D:
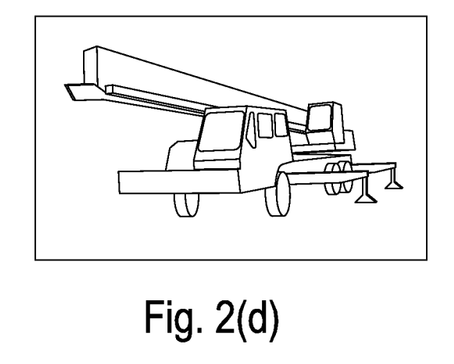

FIGS. 2(a) to 2(d) show schematic diagrams illustrating the tangible markers for the central processing station in accordance with the present invention. There are four kinds of tangible markers shown in FIGS. 2(a) to 2(d) used as the AR markers for users to manipulate information directly through physical control. In FIG. 2(a), it depicts a concrete truck. In FIG. 2(b), it depicts a dump truck. In FIG. 2(c), it depicts the route of trucks. In FIG. 2(d), it depicts the mobile crane. Once the mobile device 12a, 12b and 12c recognize the AR markers, the mobile device 12a, 12b and 12c further show the corresponding augmented reality information on the tangible touch-display screens 13a, 13b and 13c.

Figure 3A:
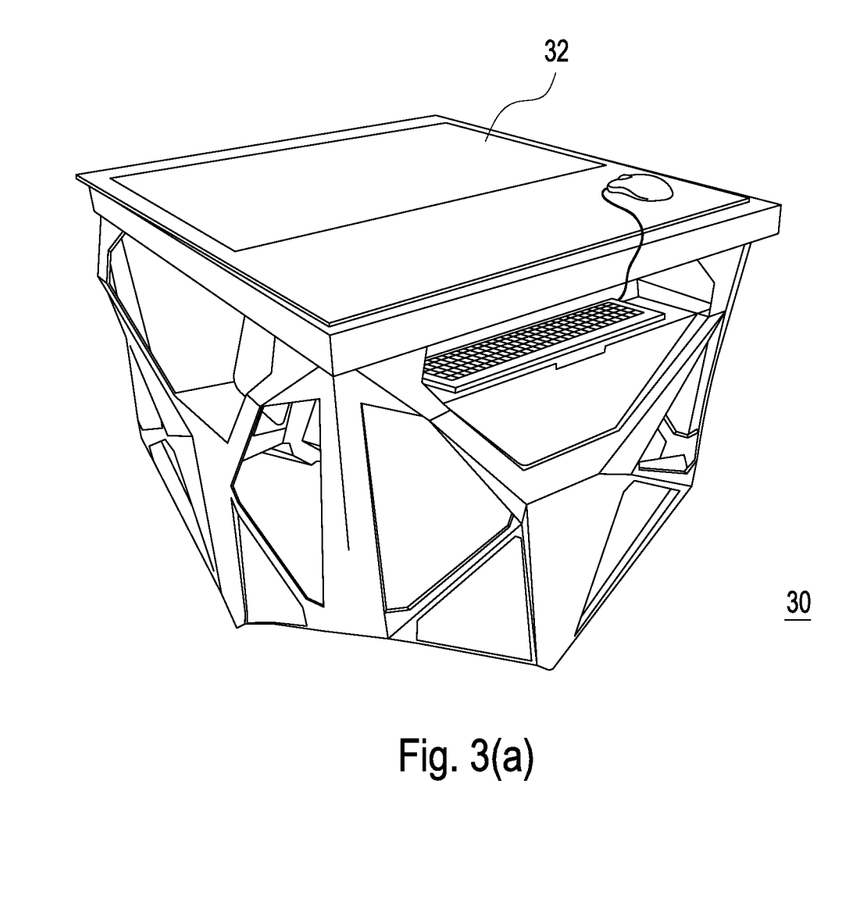
FIG. 3(a) shows a schematic diagram illustrating a building information modeling desk acting as the central processing station in accordance with the present invention.
Figure 3B:
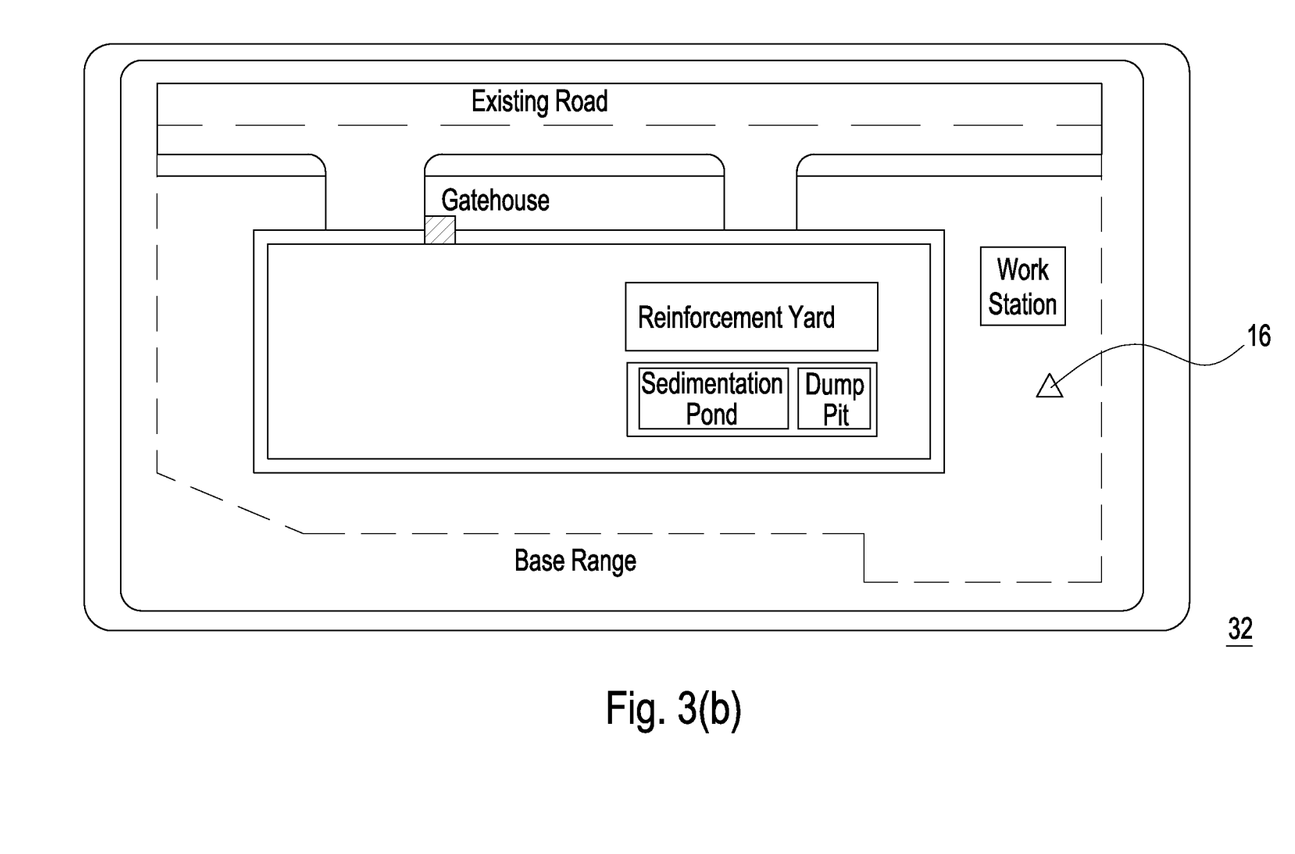
FIG. 3(b) shows a schematic diagram illustrating the desktop touch-display screen for the central processing station in accordance with the present invention.

FIG. 3(a) shows a schematic diagram illustrating a building information modeling desk acting as the central processing station in accordance with the present invention. FIG. 3(b) shows a schematic diagram illustrating the desktop touch-display screen for the central processing station in accordance with the present invention. The central processing station is preferably a customized building information modeling (BIM) table as shown in FIG. 3(a). The BIM Table 30 is a customized table for construction discussion. It combines computer and working table. The BIM table 30 displays computer information on its desktop touch-display screen 32. For instance, users can see a 2D schematic planar site layout script representing an actual construction site on desktop touch-display screen 32 of the BIM Table 30 and the markers are duly placed on the screen, as shown in FIG. 3(b).

Preferably, a Samsung Galaxy pad 2 7.0 is utilized as the mobile device part in the proposed platform. Users can see AR models displayed on markers and see private information through this pad. The present invention uses Vuforia Android SDK as a developing tool to develop an AR application for visualizing site layout and construction vehicles. Vuforia Android SDK is selected since it is a stable recognition program. This AR model is relatively steady as compared with other AR tools. Furthermore, Vuforia Android SDK can publish android applications through the unity3D game engine, which allows programmers to write customized codes in the game engine and to publish as an AR application to mobile device.

The Second Embodiment

Figure 4:
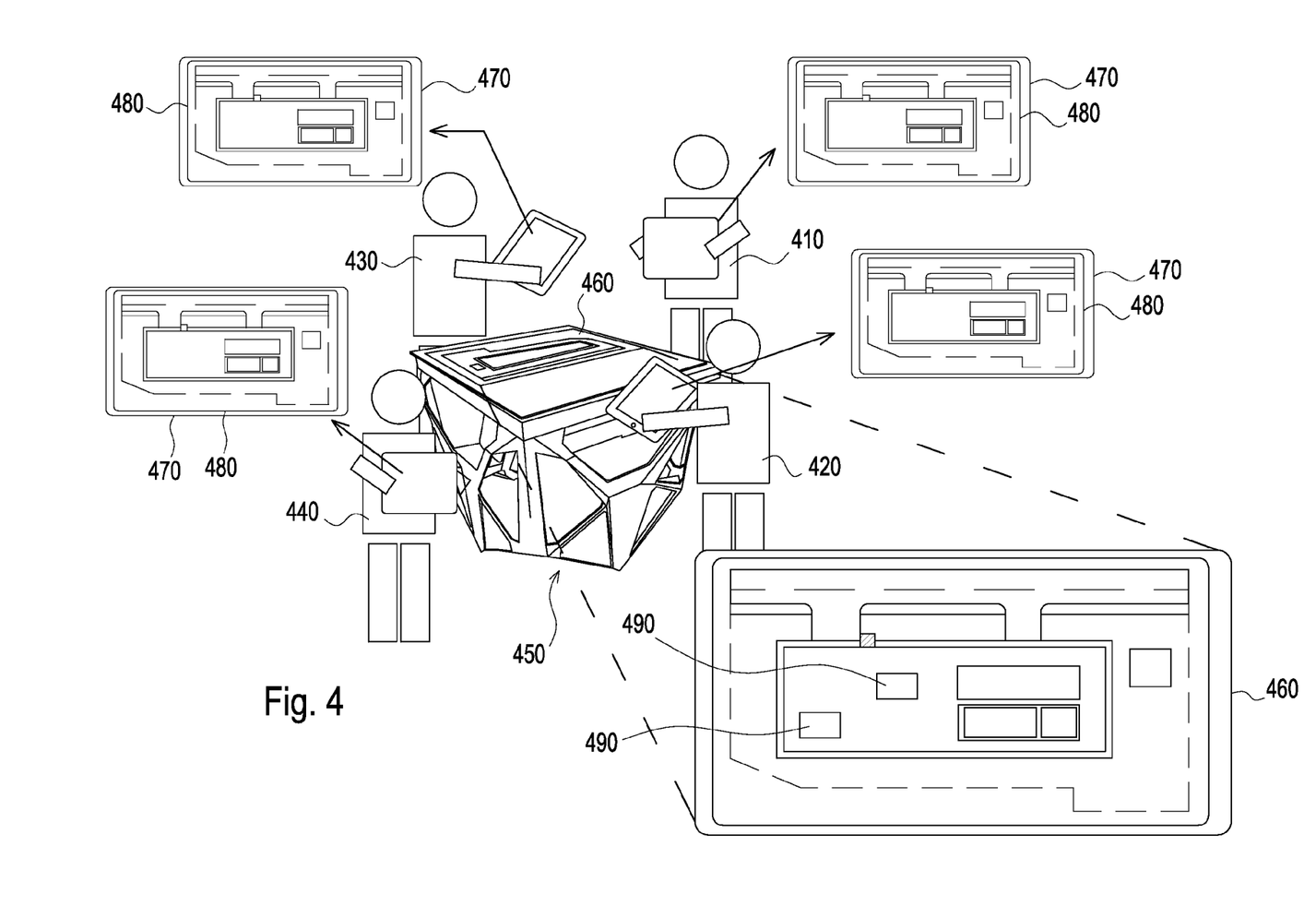
FIG. 4 shows a diagram illustrating an actual using scenario for the AR-MS system in accordance with the present invention.

FIG. 4 shows a diagram illustrating an actual using scenario for the AR-MS system in accordance with the present invention. In FIG. 4, a multi-person on-site brief meeting is being held to discuss, for example, the schedule and route arrangement of vehicles during concrete filling at the construction site. Multiple persons including a project manager 410, an on-site director 420 and two civil engineers 430 and 440 participate in this meeting and get together around a central BIM table 450 with a public table screen 460. Each participant 410, 420, 430 and 440 are provided with a personal mobile device 470 such as a smart phone or a tablet computer with a private screen 480. At the beginning of the meeting, the on-site director 420 first transmit a detailed site layout to which every participant 410, 420, 430 and 440 need to refer and which is regarded as the public information to the central BIM table 450. Then the layout is shown on the public table screen 460. Then multiple AR markers 490 are randomly placed on proper positions on the public table screen 460 in reference with the detailed site layout shown on the public table screen 460.

Each civil engineer 430 and 440 can use the respective mobile devices 470 to recognize the AR markers 490 to read the private demanding augmented reality information and show the information on his own private screen 480. For instance, the civil engineer 430 in responsible for arranging and coordinating the route for vehicles can recognize the AR markers 490 to see the private simulated virtual route for each vehicles on his own private screen 480, but the private simulated virtual route information is not shown on the public table screen 460. The civil engineer 430 can freely move the AR markers 490 on the public table screen 460 to plan, alter or rearrange the route for vehicles on his own mobile device 470 until the final result is satisfied and determined. The civil engineer 430 send the finalized route plan to the central BIM table 450 to publish the finalized route plan to every participant 410, 420, 430 and 440. The finalized route plan becomes the public information and participants 410, 420, 430 and 440 can get started to dynamically discuss the route plan. Also the project manager 410 and the on-site director 420 can supervise and check whether the respective route plans for the concrete truck, the dump truck and the mobile crane is appropriate and comprehensive, or whether there are conflicts among each route plans.

There is always too much excess information, such as a lot of diagrams and detailed schedules, provided on the on-site brief meeting which can easily distracts or diverse participant's attention during the meeting. In this embodiment, the complicated and massive information on the meeting is split into the public information and private information by program. Through the information split scheme in accordance with the present invention, the public information and private information are divided. Every participant can receive the filtered necessary information that is still abundant for participants rather than the unfiltered excess information and can privately concentrate on dealing with his own private information. Furthermore, perhaps some participant wants to reserve certain skill due to the protection of the intellectual property consideration and is not willing to publically demonstrate the skill. In this embodiment, the information split scheme in accordance with the present invention can just resolve this issue. The participant can privately utilize the skill one his own mobile device without being publically demonstrating.

To sum up, an on-site construction discussion is critical to identify, predict and resolve the potential problems in the civil engineering field. Conventionally this process merely relies on the oral communication, construction script drawing, schedule plan and other documents. Since most of the construction projects include multiple working aspects and involve multiple parties, the users in the discussion are hard to clearly obtain the whole picture about the construction site, not to mention the prediction for the future activities.

In the present invention, a visualized environment is proposed to facilitate the on-site construction discussion process. It includes a central processing station for showing the public information and multiple mobile devices for showing private information. An augmented reality technology is employed to connect the public and private information. The discussion environment is simulated by the AR-MS (augmented reality and multi-screen) system. By using this system, the complexity of discussion information can be reduced but the necessary information is still kept available during the whole discussion process.

In order to validate the AR-MS system, a user blind test (totally 36 users are participated in) is conducted. Three tasks, data-finding (DF), problem prediction (PP) and decision-making (DM), were designed to test the usability of the system. The users are requested to perform the three mentioned tasks using both AR-MS system and conventional paper-based reference. It is found that total completion time is significant reduced by using AR-MS system in both DF and PP tasks. The completion time is 55% shorter in DF task and 66% shorter in PP task as compared with that in the prior art. The correctness rate has no significant difference in the results using different display methods in the respective three tasks. In the DM task, the completion time using AR-MS system is longer than the time using the conventional paper-based reference, because users are not familiar with using new systems to perform the DM task. Based on the testing results, it demonstrates that the present invention can facilitate the discussion process by reducing the time of data finding and problem prediction, and can shorten the explanative time during the on-site construction discussion.

In the present invention, the proposed environment includes two information views (public information and private information), two information interaction methods (tangible interaction and virtual interaction) and two presentation approaches (central processing station and mobile device). Based on these approaches, an interactive augmented reality and multi-screen system (AR-MS) is implemented for on-site construction process discussion. Users, for instance, engineers, can discuss the construction information through a direct manipulation to obtain immediate feedback from AR-MS, by the intuitive tangible interface with AR models.

In this environment, multiple users share data at the same platform within the discussion environment. Multiple users from different technical field can collaborate in one of following three ways: (1) a face-to-face interaction (2) a tangible input interaction and (3) a hybrid interaction of both ways. Each user has exclusive personal private information on the objects of the augmented space. The developed environment provides users with a discussion support tool that helps its users to utilize their knowledge in discussion of efficient construction site schedules. Therefore, the discussion of construction information can be easier to understand for engineers and they can deal with potential problems in advance.

There are more embodiments further provided as follows.

Embodiment 1

An augmented reality system for use in an on-site construction process includes a plurality of mobile devices, each of which is operable by an authorized user, includes a private information accessible to the authorized user and has a tangible touch-display screen for showing the private information; a central processing station electrically connected with each of the plurality of mobile devices, including a public information accessible to all of the authorized users and having a tangible touch-display interface for showing the public information; and a plurality of tangible markers recognizable by the plurality of mobile devices and optionally placed on the tangible touch-display interface, wherein when the private information included in one of the plurality of mobile devices and accessible to the authorized user is transmitted to the central processing station, it is regarded as the public information and accessible to all of the authorized users.

Embodiment 2

The augmented reality system in Embodiment 1, when all of the authorized users demand on performing a public discussion regarding the public information, the plurality of tangible markers are optionally placed on the tangible touch-display interface by one of all of the authorized users to facilitate the discussion process.

Embodiment 3

The augmented reality system in Embodiment 1, each of the plurality of mobile devices is one selected from a group consisting of a smart phone, a tablet computer and a notebook computer.

Embodiment 4

The augmented reality system in Embodiment 1, the central processing station is a building information modeling (BIM) desk.

Embodiment 5

The augmented reality system in Embodiment 1, the private information included in the plurality of mobile devices is allowed to be modified by the authorized user.

Embodiment 6

The augmented reality system in Embodiment 1, the public information is allowed to be sent to the plurality of mobile devices and is available and accessible to the authorized user on the plurality of mobile devices.

Embodiment 7

An augmented reality system for use in an on-site construction process includes a plurality of mobile devices, each of which is operable by an authorized user, includes a private information accessible to the authorized user and has a tangible touch-display screen for showing the private information; and a central processing station electrically connected with each of the plurality of mobile devices, including a public information accessible to all of the authorized users and having a tangible touch-display interface for showing the public information, wherein when the private information included in one of the plurality of mobile devices and accessible to the authorized user is transmitted to the central processing station, it is regarded as the public information and accessible to all of the authorized users.

Embodiment 8

The augmented reality system in Embodiment 7 further includes a plurality of tangible markers recognizable by the plurality of mobile devices and optionally placed on the tangible touch-display interface.

Embodiment 9

The augmented reality system in Embodiment 8, when all of the authorized users demand on performing a public discussion regarding the public information, the plurality of tangible markers are optionally placed on the tangible touch-display interface by one of all of the authorized users to facilitate the discussion process.

Embodiment 10

The augmented reality system in Embodiment 7, each of the plurality of mobile devices is one selected from a group consisting of a smart phone, a tablet computer and a notebook computer.

Embodiment 11

The augmented reality system in Embodiment 7, the central processing station is a building information modeling (BIM) desk.

Embodiment 12

The augmented reality system in Embodiment 7, the private information included in the plurality of mobile devices is allowed to be modified by the authorized user.

Embodiment 13

The augmented reality system in Embodiment 7, the public information is allowed to be sent to the plurality of mobile devices and is available and accessible to the authorized user on the plurality of mobile devices.

Embodiment 14

An augmented reality method for use in an on-site construction process includes providing a plurality of mobile devices, each of which is operable by an authorized user, includes a private information accessible to the authorized user and has a tangible touch-display interface for showing the private information; providing a central processing station electrically connected with each of the plurality of mobile devices, including a public information accessible to all of the authorized users and having a tangible touch-display interface for showing the public information; and sending the private information to the central processing station by the authorized user for rendering the private information to be the public information accessible to all of the authorized users.

Embodiment 15

The augmented reality method in Embodiment 14, each of the plurality of mobile devices is one selected from a group consisting of a smart phone, a tablet computer and a notebook computer.

Embodiment 16

The augmented reality method in Embodiment 14, the central processing station is a building information modeling (BIM) desk.

Embodiment 17

The augmented reality method in Embodiment 14, the private information included in the plurality of mobile devices is allowed to be modified by the authorized user.

Embodiment 18

The augmented reality method in Embodiment 14, the public information is allowed to be sent to the plurality of mobile devices and is available and accessible to the authorized user on the plurality of mobile devices.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An augmented reality system for use in an on-site civil engineering construction process, comprising:
   a central processing station including and processing a public information accessible to all users and having a tangible touch-display interface for showing the public information;
   a plurality of mobile devices, each of which is electrically connected with the central processing station, is correspondingly operable by an authorized user of all users, includes and processes a private information exclusively accessible to the authorized user and has a tangible touch-display screen for showing the private information and a camera; and
   a plurality of tangible markers recognizable by the camera on each of the plurality of mobile devices and optionally placed on the tangible touch-display interface,
   wherein once the private information included in one of the plurality of mobile devices and accessible to the authorized user is transmitted to the central processing station, it is regarded as the public information and accessible to all users, such that all information inputted into the system is classified into the private information and the public information based on the device it stored.

2. The augmented reality system in claim 1, wherein when the authorized user demands on performing a public discussion regarding the public information, the plurality of tangible markers are optionally placed on the tangible touch-display interface by the authorized user on demand to facilitate the discussion process.

3. The augmented reality system in claim 1, wherein each of the plurality of mobile devices is one selected from a group consisting of a smart phone, a tablet computer and a notebook computer.

4. The augmented reality system in claim 1, wherein the central processing station is a building information modeling (BIM) desk.

5. The augmented reality system in claim 1, wherein the private information included in the plurality of mobile devices is exclusively allowed to be modified by the authorized user.

6. The augmented reality system in claim 1, wherein the public information is allowed to be sent to the plurality of mobile devices and is available and accessible to the authorized user on the plurality of mobile devices.

7. An augmented reality system for use in an on-site civil engineering construction process, comprising:
   a central processing station including and processing a public information accessible to all users and having a tangible touch-display interface for showing the public information; and
   a plurality of mobile devices, each of which is electrically connected with the central processing station, is correspondingly operable by an authorized user of all users, includes and processes a private information exclusively accessible to the authorized user and has a tangible touch-display screen for showing the private information and a camera,
   wherein once the private information included in one of the plurality of mobile devices and accessible to the authorized user is transmitted to the central processing station, it is regarded as the public information and accessible to all users, such that all information inputted into the system is classified into the private information and the public information based on the device it stored.

8. The augmented reality system in claim 7 further comprising:
   a plurality of tangible markers recognizable by the camera on each of the plurality of mobile devices and optionally placed on the tangible touch-display interface.

9. The augmented reality system in claim 8, wherein when the authorized user demands on performing a public discussion regarding the public information, the plurality of tangible markers are optionally placed on the tangible touch-display interface by the authorized user on demand to facilitate the discussion process.

10. The augmented reality system in claim 7, wherein each of the plurality of mobile devices is one selected from a group consisting of a smart phone, a tablet computer and a notebook computer.

11. The augmented reality system in claim 7, wherein the central processing station is a building information modeling (BIM) desk.

12. The augmented reality system in claim 7, wherein the private information included in the plurality of mobile devices is exclusively allowed to be modified by the authorized user.

13. The augmented reality system in claim 7, wherein the public information is allowed to be sent to the plurality of mobile devices and is available and accessible to the authorized user on the plurality of mobile devices.

14. An augmented reality method for use in an on-site civil engineering construction process, comprising:

providing a central processing station including and processing a public information accessible to all users and having a tangible touch-display interface for showing the public information;

providing a plurality of mobile devices, each of which is electrically connected with each of the plurality of mobile devices, is correspondingly operable by an authorized user of all users, includes and processes a private information exclusively accessible to the authorized user and has a tangible touch-display screen for showing the private information; and sending the private information to the central processing station by the authorized user for rendering the private information to be regarded as the public information accessible to all users, such that all information inputted into the system is classified into the private information and the public information based on the device it stored.

15. The augmented reality method in claim 14, wherein each of the plurality of mobile devices is one selected from a group consisting of a smart phone, a tablet computer and a notebook computer.

16. The augmented reality method in claim 14, wherein the central processing station is a building information modeling (BIM) desk.

17. The augmented reality method in claim 14, wherein the private information included in the plurality of mobile devices is exclusively allowed to be modified by the authorized user.

18. The augmented reality method in claim 14, wherein the public information is allowed to be sent to the plurality of mobile devices and is available and accessible to the authorized user on the plurality of mobile devices.

* * * * *